(12) United States Patent
Cheng et al.

(10) Patent No.: US 7,767,318 B2
(45) Date of Patent: Aug. 3, 2010

(54) LASER FILLET WELDING

(75) Inventors: Kenny Cheng, Singapore (SG); Kok Hai Luah, Singapore (SG)

(73) Assignee: United Technologies Corporation, Hartford, CT (US)

( * ) Notice: Subject to any disclaimer, the term of this patent is extended or adjusted under 35 U.S.C. 154(b) by 347 days.

(21) Appl. No.: 11/699,967

(22) Filed: Jan. 30, 2007

(65) Prior Publication Data

US 2008/0118768 A1    May 22, 2008

(51) Int. Cl.
- *B32B 3/10* (2006.01)
- *B32B 15/01* (2006.01)
- *B23K 26/24* (2006.01)

(52) U.S. Cl. .................... 428/696; 219/121.64
(58) Field of Classification Search ............ 219/121.63, 219/121.64; 403/270, 271, 272; 148/525; 428/594, 596, 615
See application file for complete search history.

(56) References Cited

U.S. PATENT DOCUMENTS

| | | | |
|---|---|---|---|
| 2,737,597 | A | 3/1956 | Strobino |
| 4,555,610 | A | 11/1985 | Polad et al. |
| 4,587,396 | A | 5/1986 | Rubin |
| 4,947,487 | A | 8/1990 | Saffer et al. |
| 4,972,074 | A | 11/1990 | Wright |
| 5,403,156 | A | 4/1995 | Arness et al. |
| 5,504,300 | A * | 4/1996 | Devanathan et al. ... 219/121.64 |
| 5,816,676 | A | 10/1998 | Myers et al. |
| 5,902,498 | A * | 5/1999 | Mistry et al. ........... 219/121.64 |
| 6,123,506 | A | 9/2000 | Brand et al. |
| 6,471,475 | B1 | 10/2002 | Sasu et al. |
| 6,501,515 | B1 | 12/2002 | Iwamura |
| 6,531,005 | B1 | 3/2003 | Bezerra et al. |
| 6,596,962 | B2 * | 7/2003 | Haschke ................. 219/121.64 |
| 6,786,696 | B2 | 9/2004 | Herman et al. |
| 6,833,525 | B1 | 12/2004 | Clement et al. |
| 6,875,949 | B2 * | 4/2005 | Hall ...................... 219/121.64 |
| 6,919,554 | B2 | 7/2005 | Braune et al. |
| 6,974,306 | B2 | 12/2005 | Djeridane et al. |
| 6,981,845 | B2 | 1/2006 | Balland et al. |
| 7,025,563 | B2 | 4/2006 | Servadio et al. |
| 7,030,337 | B2 | 4/2006 | Baker et al. |
| 7,032,904 | B2 | 4/2006 | Rogers |
| 7,043,898 | B2 | 5/2006 | Rago |
| 7,100,358 | B2 | 9/2006 | Gekht et al. |
| 7,140,952 | B1 | 11/2006 | Juneau et al. |

(Continued)

FOREIGN PATENT DOCUMENTS

EP    1690630    8/2006

(Continued)

OTHER PUBLICATIONS

Official Search Report and Written Opinion of the European Patent Office in counterpart foreign Application No. EP 07254530 filed Nov. 21, 2007.

*Primary Examiner*—Geoffrey S Evans
(74) *Attorney, Agent, or Firm*—Kinney & Lange, P.A.

(57) ABSTRACT

A metal article and a method for welding the metal parts to form the metal article, where the method comprises feeding filler material to an intersection of the metal parts, and melting the filler material with a laser beam to form a weld between the metal parts at the intersection.

9 Claims, 3 Drawing Sheets

U.S. PATENT DOCUMENTS

| | | |
|---|---|---|
| 7,150,797 B2 * | 12/2006 | Tsushima et al. ...... 219/121.64 |
| 2001/0013509 A1 | 8/2001 | Haschke |
| 2002/0126026 A1 | 9/2002 | Lee et al. |
| 2002/0170893 A1 | 11/2002 | Rohleder et al. |
| 2004/0100560 A1 | 5/2004 | Stavely et al. |
| 2004/0189169 A1 | 9/2004 | Taniguchi et al. |
| 2004/0217266 A1 | 11/2004 | Bechtel et al. |
| 2004/0255573 A1 | 12/2004 | Rago |
| 2005/0022501 A1 | 2/2005 | Eleftheriou et al. |
| 2005/0109013 A1 | 5/2005 | Eleftheriou et al. |
| 2006/0010852 A1 | 1/2006 | Gekht et al. |
| 2006/0049153 A1 * | 3/2006 | Cahoon et al. ......... 219/121.63 |
| 2006/0120855 A1 | 6/2006 | Djeridane et al. |
| 2006/0174962 A1 | 8/2006 | Stastny et al. |
| 2006/0242816 A1 | 11/2006 | Magdy |
| 2006/0260127 A1 | 11/2006 | Gekht et al. |
| 2008/0135530 A1 * | 6/2008 | Lee et al. ............... 219/121.64 |

FOREIGN PATENT DOCUMENTS

| | | | | |
|---|---|---|---|---|
| JP | 57020487 | | | 2/1982 |
| JP | 63-115673 | A | * | 5/1988 |
| JP | 1-162587 | A | * | 6/1989 |
| JP | 402151385 | A | | 6/1990 |
| JP | 3-230885 | A | * | 10/1991 |
| JP | 3-234393 | A | * | 10/1991 |
| JP | 4-162974 | A | * | 6/1992 |
| JP | 6-289183 | A | * | 10/1994 |
| JP | 411347774 | A | | 12/1999 |
| JP | 2003-138935 | A | * | 5/2003 |
| JP | 2004-148333 | A | * | 5/2004 |

* cited by examiner

LASER FILLET WELDING

CROSS-REFERENCE TO RELATED APPLICATION(S)

This application claims priority of Singapore Patent Application No. 200608084-0, filed on Nov. 21, 2006, and entitled "LASER FILLET WELDING".

BACKGROUND OF THE INVENTION

The present invention relates to methods for welding. In particular, the present invention relates to methods of welding metal parts, such as parts for aerospace and aviation applications, with the use of laser welding techniques.

In gas turbine engines, it is important to cool the turbine airfoils to preserve the integrity of the airfoil structure and also to attain high engine performance by operating the turbine at optimum temperature levels. It is also important to avoid utilizing more cooling air than is necessary to minimize the overall penalty that occurs with the use of engine air for purposes other than generating thrust or horsepower.

One method of optimizing the use of cooling air is to employ meter plates to restrict the flow entering into the blade roots of each of the airfoils. Meter plates are typically secured to the blade roots of the airfoils with laser seam welding operations. To ensure that the meter plates remain secured to the blade roots during engine operation, the welds between each meter plate and blade root are required to have a minimum weld leg length. However, with laser seam welding, increasing the weld leg length correspondingly increases the weld penetration depth. This undesirably extends the heat-affected zone of the weld, which may form porous regions and cracks in the weld. Additionally, laser seam welds are difficult to visually evaluate if the meter plate is properly welded to the blade root. As such, there is a need for a welding process that provides good welds between metal parts (e.g., meter plates and blade roots), which are also easy to inspect.

BRIEF SUMMARY OF THE INVENTION

The present invention relates to a welded metal article and a method for welding metal parts to form the welded metal article. The method includes forming an intersection between a first metal part and a second metal part, feeding filler material to the intersection, and melting the filler material with a laser beam. This allows the melted filler material to fuse to the first metal part and the second metal part to form a weld at the intersection.

DETAILED DESCRIPTION

Figure 1:
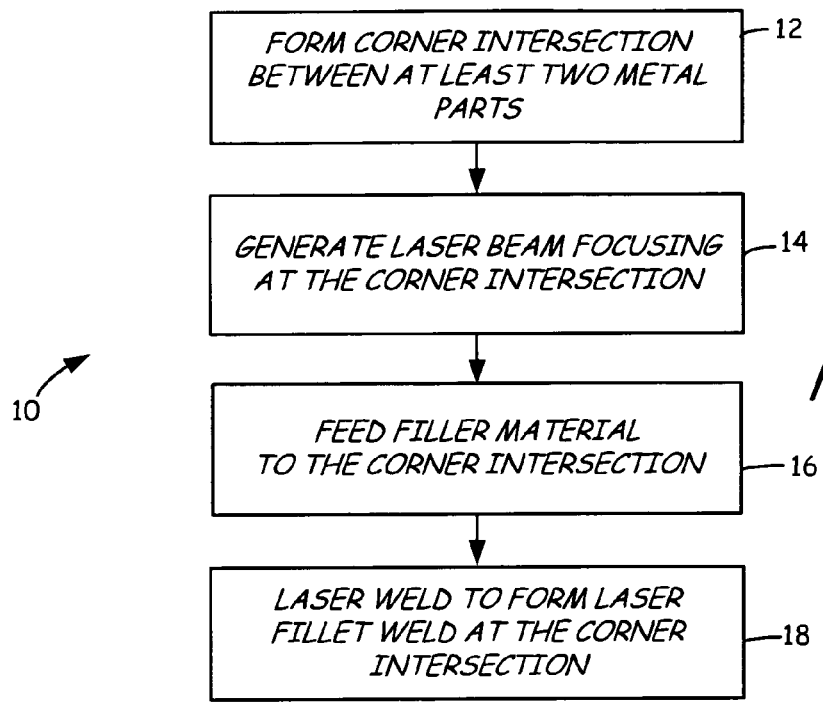
FIG. 1 is a flow diagram of a method for welding metal parts with a laser fillet welding operation.

FIG. 1 is a flow diagram of method 10 for welding first and second metal parts with a laser fillet welding operation. As shown, method 10 includes steps 12-18, and initially involves forming a corner intersection between at least two overlapping metal parts (step 12). This is performed by positioning a first metal part having an edge portion (e.g., a meter plate) on top of a surface of a second metal part (e.g., a blade root) such that the first metal part is flush with the surface of the second metal part. This forms a corner intersection between the edge portion of the first metal part and the surface of the second metal part. The corner intersection may extend around the entire perimeter of the first metal part or around a portion of the perimeter of the first metal part. Prior to laser welding, the first metal part may be manually resistance tack welded to the second metal part using standard techniques to ensure proper contact between the metal parts.

A laser beam is then generated and positioned such that it focuses at the corner intersection (i.e., a focal point of the laser beam is located at the corner intersection) (step 14). Filler material is then fed to the corner intersection such that the laser beam focuses on, or adjacent to, the filler material (step 16). The filler material is a supply of a metal material used to fuse the edge portion of the first metal part to the surface of the second metal part. The filler material may be supplied in a variety of media, such as powders, granules, wire stock, and rod stock. Suitable materials for the filler material and for the metal parts include laser-weldable metals, such as aluminum, steel, iron, titanium, nickel, cobalt, and alloys thereof.

The laser beam is then used to laser weld the filler material and the metal parts (step 18). The energy from the laser beam is absorbed by the filler material, which melts the filler material and allows the melted filler material to fuse to the edge portion of the first metal part and the surface of the second metal part. This forms a laser fillet weld at the corner intersection, thereby securing the metal parts together. The laser beam is then moved around the entire perimeter of the first metal part while filler material is continuously fed to the laser beam at the corner intersection. This forms a final welded structure where the first metal part is welded to the second metal part around the entire perimeter of the first metal part.

In one embodiment, the filler material is fed to the corner intersection through a nozzle of a laser system. In this embodiment, steps 14-18 of method 10 are performed in a substantially simultaneous manner. The laser beam melts the filler material as the filler material is continuously fed from the nozzle to the corner intersection. As the melted filler material is deposited at the corner intersection, the melted filler material fuses to the edge portion of the first metal part and the surface of the second metal part, thereby forming the laser fillet weld at the corner intersection.

Because a substantial amount of the energy of the laser beam is absorbed by the filler material, the depth of penetration of the weld into the surface of the second metal part is reduced. As a result, the heat-affected zone of the weld is correspondingly reduced, thereby reducing the formation of cracks and large porous regions in the weld. Furthermore, the resulting weld is easy to inspect for proper fusion along the weld path because the weld is located at the corner intersection of the metal parts. This is in contrast to laser seam welds, which are more difficult to inspect because the welds are located between metal parts rather than at a corner intersection. Accordingly, laser fillet welding the filler material at the corner intersection of the metal parts provides a secure weld that is suitable for use in a variety of application, such as aerospace and aviation applications. Examples of suitable applications for method 10 include meter plate/blade root welding operations, turbine vane cover installations, and other welding applications that are typically laser seam welded.

Figure 2:
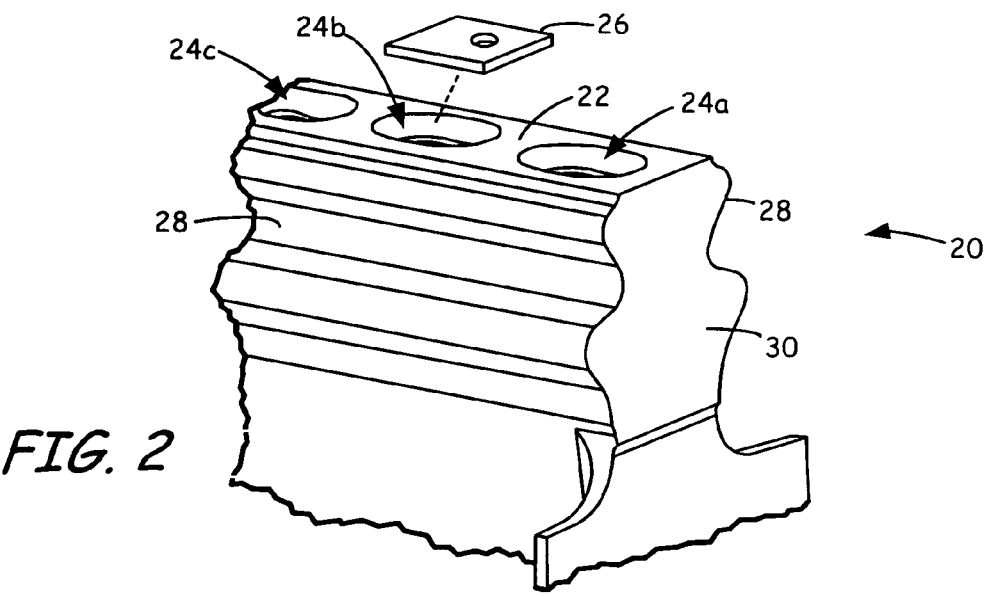
FIG. 2 is a bottom perspective view of a turbine blade root containing a meter plate secured to an end wall of the turbine blade root with a laser fillet weld.
Figure 3:
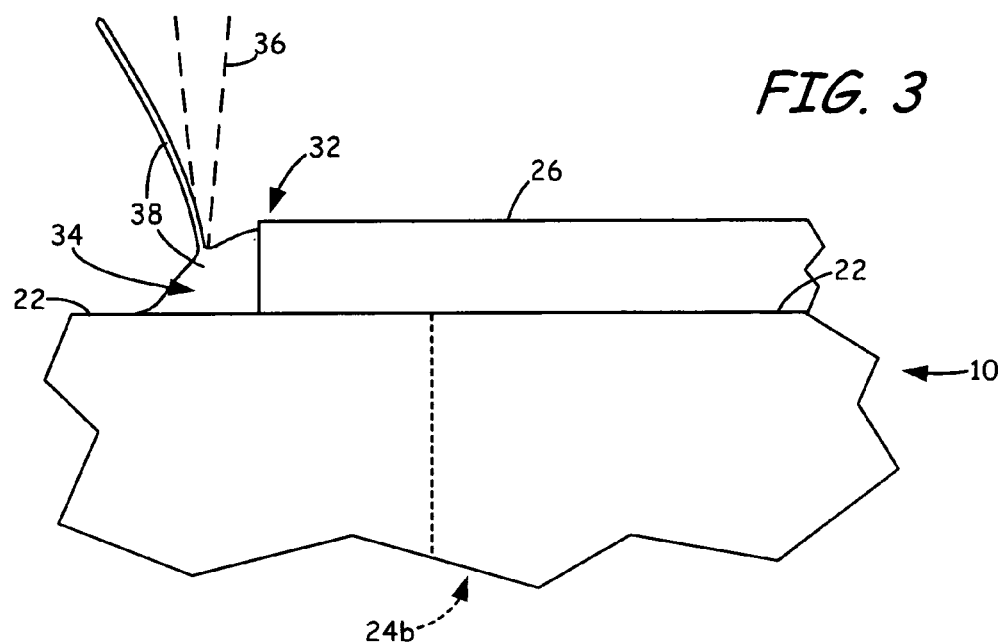
FIGS. 3 and 4 are expanded side views of the end wall and the meter plate, which illustrate the laser fillet welding operation.
Figure 4:
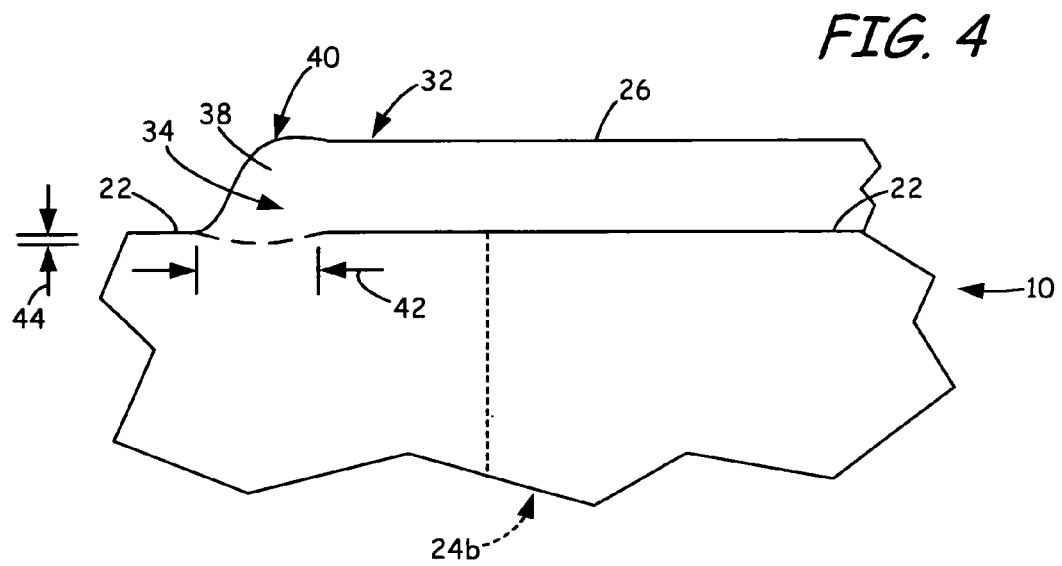

FIGS. 2-4 illustrate a suitable application of method 10 for producing laser fillet welds with turbine airfoil components. FIG. 2 is a bottom perspective view of blade root 20, which is a turbine blade root that is insertable into a dovetail slot (not shown) of a supporting rotor disk (not shown). As shown, blade root 20 includes end wall 22, inlet apertures 24a-24c, meter plate 26, lobed walls 28, and front face 30. End wall 22 is a wall segment extending at the base of lobed walls 28 and front face 30. Inlet apertures 24a-24c are openings within blade root 20 for receiving cooling air during operation.

As further shown, meter plate 26 is disposed over end wall 22 and inlet aperture 24b. When meter plate 26 is secured to end wall 22, meter plate 26 extends over inlet aperture 24b for restricting the flow of air through inlet aperture 24b during operation. As discussed below, meter plate 26 is secured to end wall 22 with the laser fillet welding operation of method 10 (shown in FIG. 1). This secures meter plate 26 to end wall 22 with a laser fillet weld, which reduces penetration depths within end wall 22, has a reduced heat-affected zone, and is easy to inspect.

While blade root 20 is shown with a single meter plate 26 being secured over inlet aperture 24b, meter plates may also be secured over one or more inlet apertures (e.g., inlet apertures 24a and 24c) in a similar manner, and each meter plate may cover one or more inlet apertures. Additionally, while meter plate 26 is shown in FIG. 1 as being secured to end wall 22, a similar arrangement may be used with blade roots having inlet apertures in front face 30. In this embodiment, meter plate 26 is secured to front face 30 with the laser fillet welding operation of method 10, which correspondingly reduces penetration depths within front face 30, has a reduced heat-affected zone, and is easy to inspect.

FIGS. 3 and 4 are expanded side views of end wall 22 and meter plate 26, which illustrate the laser fillet welding operation of method 10 (shown in FIG. 1). FIG. 3 shows end wall 22 and meter plate 26 prior to welding, where meter plate 26 includes edge portion 32. Pursuant to step 12 of method 10, edge portion 32 is disposed on end wall 22 such that edge portion 32 forms corner intersection 34 with end wall 22. While only a section of edge portion 32 is shown in FIG. 3, edge portion 32 extends around the entire perimeter of meter plate 26.

Pursuant to step 14 of method 10, laser beam 36 is generated from a laser system (not shown), and is positioned such that laser beam 36 focuses at corner intersection 34. Examples of suitable laser systems for use with the present invention include solid-state laser systems and gas laser systems (e.g., Nd:YAG and $CO_2$ lasers).

Pursuant to step 16 of method 10, filler material 38 is fed onto end wall 22 at corner intersection 34, such that laser beam 36 focuses on filler material 38. Depending on the intensity of laser beam 36, laser beam 36 may focus on, or adjacent to, filler material 38. As shown in FIG. 3, filler material 38 is fed to laser beam 36 in a continuous manner, where laser beam 36 melts filler material 38 as filler material 38 reaches corner intersection 34. This may be performed with a laser system that includes a nozzle (not shown) for depositing filler material 38. For example, filler material 38 may be fed through the nozzle of the laser system in a continuous manner. This allows laser beam 36 to melt filler material 38 as filler material 38 exits the nozzle.

The energy from laser beam 36 is absorbed by filler material 38, which heats up and melts filler material 38. The energy of laser beam 36 also results in localized melting of end wall 22 and edge portion 32, thereby causing the molten metals of end wall 22, edge portion 32, and filler material 38 to mix and fuse together. Laser beam 36 is then moved around the entire perimeter of meter plate 26, and filler material 38 is continuously fed to laser beam 36, thereby forming a laser fillet weld around the entire perimeter of meter plate 26.

FIG. 4 shows end wall 22 and meter plate 26 after the laser fillet welding operation. As shown, end wall 22 and edge portion 32 of meter plate 26 are fused together at welded joint 40. Welded joint 40 is a laser fillet weld that includes a fused agglomerate of metals from end wall 22, edge portion 32, and filler material 38. This secures meter plate 26 to end wall 22 over inlet aperture 24b for restricting the flow of air through inlet aperture 24b during operation. As shown in FIG. 4, welded joint 40 has a weld leg length (referred to as leg length 42) extending from edge portion 32 of meter plate 26, and a penetration depth (referred to a penetration depth 44) extending into end wall 22.

Because a substantial amount of the energy of laser beam 36 (shown in FIG. 3) is absorbed by filler material 38, penetration depth 44 of the welded joint 40 is reduced, even with large lengths for leg length 42. This allows leg length 42 to be large to secure meter plate 26 to end wall 22, while also reducing the heat-affected zone of welded joint 40. Suitable lengths for leg length 42 range from about 500 micrometers (about 20 mils) to about 1,300 micrometers (about 50 mils). Suitable depths within end wall 22 for penetration depth 32 include less than about 25% of the length of leg length 42, and particularly suitable depths includes less than about 10% of the length of leg length 42.

As discussed above, reducing penetration depth 44 correspondingly reduces the heat-affected zone of welded joint 40. Reducing the heat-affected zone of welded joint 40 reduces the formation of cracks and large porous regions in welded joint 40, thereby increasing the strength and reliability of welded joint 40. Furthermore, the welded joint 40 is easy to inspect for proper fusion along the weld path because welded joint 40 is located at corner intersection 34 of end wall 22 and edge portion 32.

EXAMPLES

The present invention is more particularly described in the following examples that are intended as illustrations only, since numerous modifications and variations within the scope of the present invention will be apparent to those skilled in the art. Welded joints of Example 1 and Comparative Example A were each formed at a corner intersection of a meter plate and an end wall of a blade root, which correspond to end wall 22 and meter plate 26 (shown in FIGS. 2-4). For the welded joint of Example 1, the blade root was restrained in a fixture mount and the meter plate was then positioned on a surface of the blade root to form a corner intersection. The meter plate was then manually tack welded to the blade root to maintain the meter plate's position and to ensure proper contact between the meter plate and the blade root.

Filler material (powdered PWA 1447 nickel-based alloy) was then deposited at the corner intersection, and a computer numerical controlled $CO_2$ laser system (Huffman model HC-205 from Huffman Corporation, Clover, S.C.) was then used to laser fillet weld the entire perimeter of the meter plate. As the laser beam was moved relative to the perimeter of the meter plate, the filler material was continuously fed to the laser beam, thereby forming a laser fillet welded joint around the perimeter of the meter plate.

Figure 5:
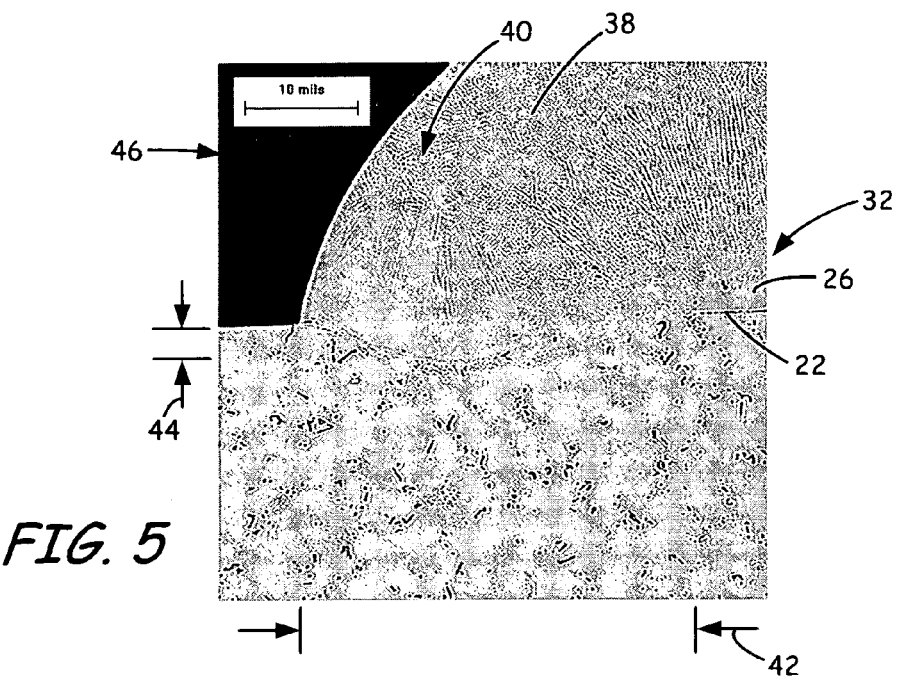
FIG. 5 is a macrograph of a section of an example weld formed with a laser fillet welding operation.

FIG. 5 is a macrograph of a section of the welded joint of Example 1, which corresponds to welded joint 40 (shown in FIG. 4). The reference numerals provided in FIG. 4 are correspondingly used in FIG. 5 for ease of discussion. End wall 22, welded joint 40, and edge portion 32 of meter plate 26 can be seen in FIG. 5. The dark portion 46 shown in FIG. 5 is an epoxy mold that encased the sectioned welded joint 40. As shown in FIG. 5, welded joint 40 does not penetrate very far below the surface of end wall 22. In fact, penetration depth 44 of welded joint 40 is less than 10% of its weld leg length 42 from edge portion 32 of meter plate 26.

As discussed above, a substantial amount of the energy of laser beam 36 is absorbed by filler material 38, which reduces penetration depth 44 of welded joint 40 into end wall 22 of blade root 20. This correspondingly reduces the heat-affected zone of welded joint 40. This is evidenced in FIG. 5, where welded joint 40 is substantially free of cracks and large pores or voids. As such, the resulting welded joint 40 of Example 1 provides a strong weld between meter plate 26 and blade root 20.

For the welded joint of Comparative Example A, the blade root was also restrained in a fixture mount, and the meter plate was then positioned on a surface of the blade root to form a corner intersection. The meter plate was then manually tack welded to the blade root to maintain the meter plate's position and to ensure proper contact between the meter plate and the blade root. A computer numerical controlled $CO_2$ laser system (Huffman model HC-205 from Huffman Corporation, Clover, S.C.), without filler material, was then used to laser seam weld the entire perimeter of the meter plate to the blade root, thereby forming a laser seam welded joint.

Figure 6:
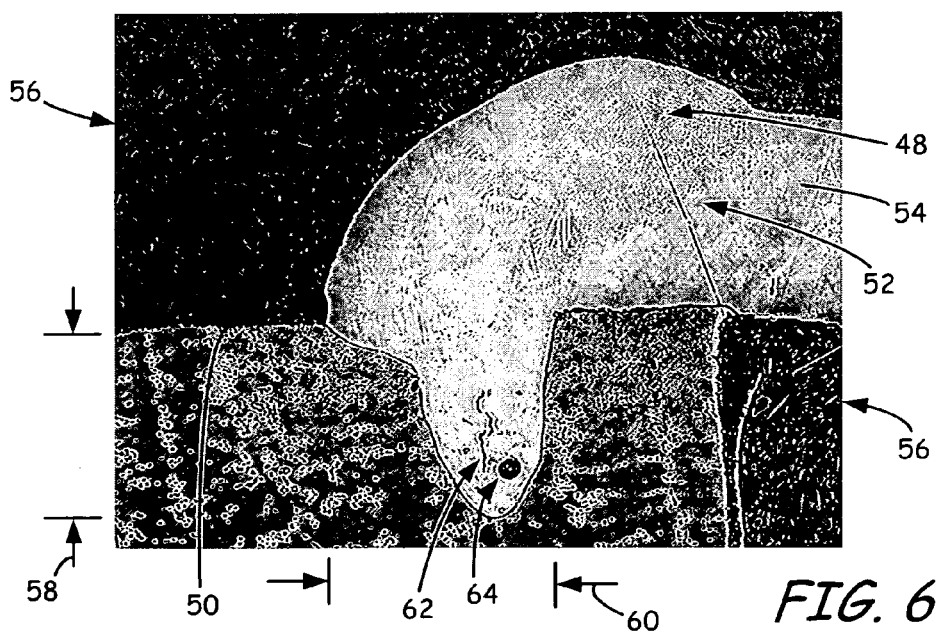
FIG. 6 is a macrograph of a section of a comparative example weld formed with a laser seam welding operation.

FIG. 6 is a macrograph of a section of welded joint 48 of Comparative Example A, which secured end wall 50 of a blade root to edge portion 52 of meter plate 54. End wall 50 and meter plate 54 correspond to end wall 22 and meter plate 26 (shown in FIG. 5). End wall 50, welded joint 48 (substantially penetrating into end wall 50), and edge portion 52 of meter plate 54 can be seen in FIG. 6. The dark portions 56 shown in FIG. 6 are an epoxy mold that encased the sectioned welded joint 48.

In contrast to the laser fillet welding operation of Example 1, the laser seam welding operation of Comparative Example A did not include filler material 38. As such, the laser beam was positioned above edge portion 52 of meter plate 54, thereby directly welding meter plate 54 to end wall 50 of the blade root. This caused welded joint 48 to penetrate substantially below the surface of end wall 50. As shown, welded joint 48 had a penetration depth 58 that was almost as deep as its weld leg length 60 from edge portion 52 of meter plate 54. This increased the heat-affected zone of welded joint 48, causing cracks 62 and a large void 64 to form in welded joint 48. Cracks 62 and void 64 accordingly reduced the strength of welded joint 48 of Comparative Example A.

A comparison of welded joints 40 and 48 (shown in FIGS. 5 and 6, respectively) illustrates the benefits of laser welding meter plate 26 to blade root 20 with the use of filler material 38, where filler material 38 is fed to corner intersection 34 of meter plate 26 and blade root 20. Accordingly, the laser fillet welding operation of the present invention provides secure welded joints (e.g., welded joint 40) between metal parts that are strong and easy to inspect.

Although the present invention has been described with reference to preferred embodiments, workers skilled in the art will recognize that changes may be made in form and detail without departing from the spirit and scope of the invention.

The invention claimed is:

1. A method for welding a first metal part to a second metal part, the method comprising:
    forming an intersection between the first metal part and the second metal part;
    feeding powdered filler material to the intersection; and
    melting the powdered filler material with a laser beam, thereby allowing the melted powdered filler material to fuse to the first metal part and the second metal part to form a weld at the intersection, wherein the weld has a penetration depth into the second metal part and a weld leg length from the first metal part, the penetration depth being less than about 10% of the weld leg length, and wherein the heat affected zone is reduced to substantially eliminate formation of cracks and large pores.

2. The method of claim 1, wherein the laser beam has a focal point located at the intersection.

3. The method of claim 1, wherein the weld extends around an entire perimeter of the first metal part.

4. The method of claim 1, wherein forming the intersection comprises positioning the first metal part flush with a surface of the second metal part.

5. A metal article comprising:
    a first metal part having a surface;
    a second metal part having an edge portion disposed adjacent the surface of the first metal part; and
    a laser powder fusion interconnecting the first metal part and the edge portion of the second metal part to form a laser fillet weld, wherein the laser fillet weld has a penetration depth into the second metal part and a weld leg length from the first metal part, the penetration depth being less than about 10% of the weld leg length, and wherein the heat affected zone is reduced to substantially eliminate formation of cracks and large pores.

6. The metal article of claim 5, wherein the laser fillet weld secures the surface of the first metal part to the edge portion of the second metal part with a filler material.

7. The metal article of claim 5, wherein the first metal part is a blade root having an inlet aperture disposed within the surface, and wherein the second metal part is a meter plate secured over the inlet aperture.

8. The metal article of claim 7, wherein the surface is selected from the group consisting of an end wall surface of the blade root and a front face surface of the blade root.

9. The metal article of claim 5, wherein the laser fillet weld extends around an entire perimeter of the second metal part.

* * * * *